United States Patent [19]

Yamaguchi et al.

[11] Patent Number: 5,329,766
[45] Date of Patent: Jul. 19, 1994

[54] HYDRAULIC POWER STEERING SYSTEM WITH INPUT DETECTION CAPABILITY

[75] Inventors: Masayoshi Yamaguchi, Kameoka; Tsuyoshi Sasaki, Kyoto; Hisao Nagata, Ohbu; Ichiro Nagasaka, Nishio, all of Japan

[73] Assignee: Eaton Corporation, Cleveland, Ohio

[21] Appl. No.: 29,081

[22] Filed: Mar. 10, 1993

[30] Foreign Application Priority Data

Mar. 19, 1992 [JP] Japan .................. 4-063973

[51] Int. Cl.$^5$ .......................................... F16D 31/02
[52] U.S. Cl. .......................... 60/384; 60/452; 60/477
[58] Field of Search ............... 60/384, 431, 452, 477; 91/375 R, 516

[56] References Cited

U.S. PATENT DOCUMENTS

| | | | |
|---|---|---|---|
| 3,423,934 | 1/1969 | Mercier | 60/384 |
| 4,730,544 | 3/1988 | Jorgensen | 60/384 |
| 5,065,793 | 11/1991 | Stephenson et al. | 91/516 |

Primary Examiner—Richard A. Bertsch
Assistant Examiner—F. Daniel Lopez
Attorney, Agent, or Firm—L. J. Kasper

[57] ABSTRACT

A hydrostatic power steering system is provided of the type including a steering control unit (3) operated by an input such as a steering wheel (1) to control flow from a source (8) to a steering cylinder (7). The source is operated in response to an electrical signal from a controller (82), controlled by a sensed pressure at a pressure detection port (64). The pressure at the port (64) is communicated from the main fluid path of the steering control unit (3), downstream of the fluid meter (18) when the spool (21) and sleeve (22) are relatively displaced. In systems in which the system reservoir (R) is at an elevated ("regulated tank") pressure, the pressure detection circuit is drained through a variable orifice (70) to a drain port (66), which is in communication with a sump (S) maintained at substantially atmospheric pressure. As a result, the steering system responds at a lower steering pressure, and the initial steering is smoother.

8 Claims, 4 Drawing Sheets

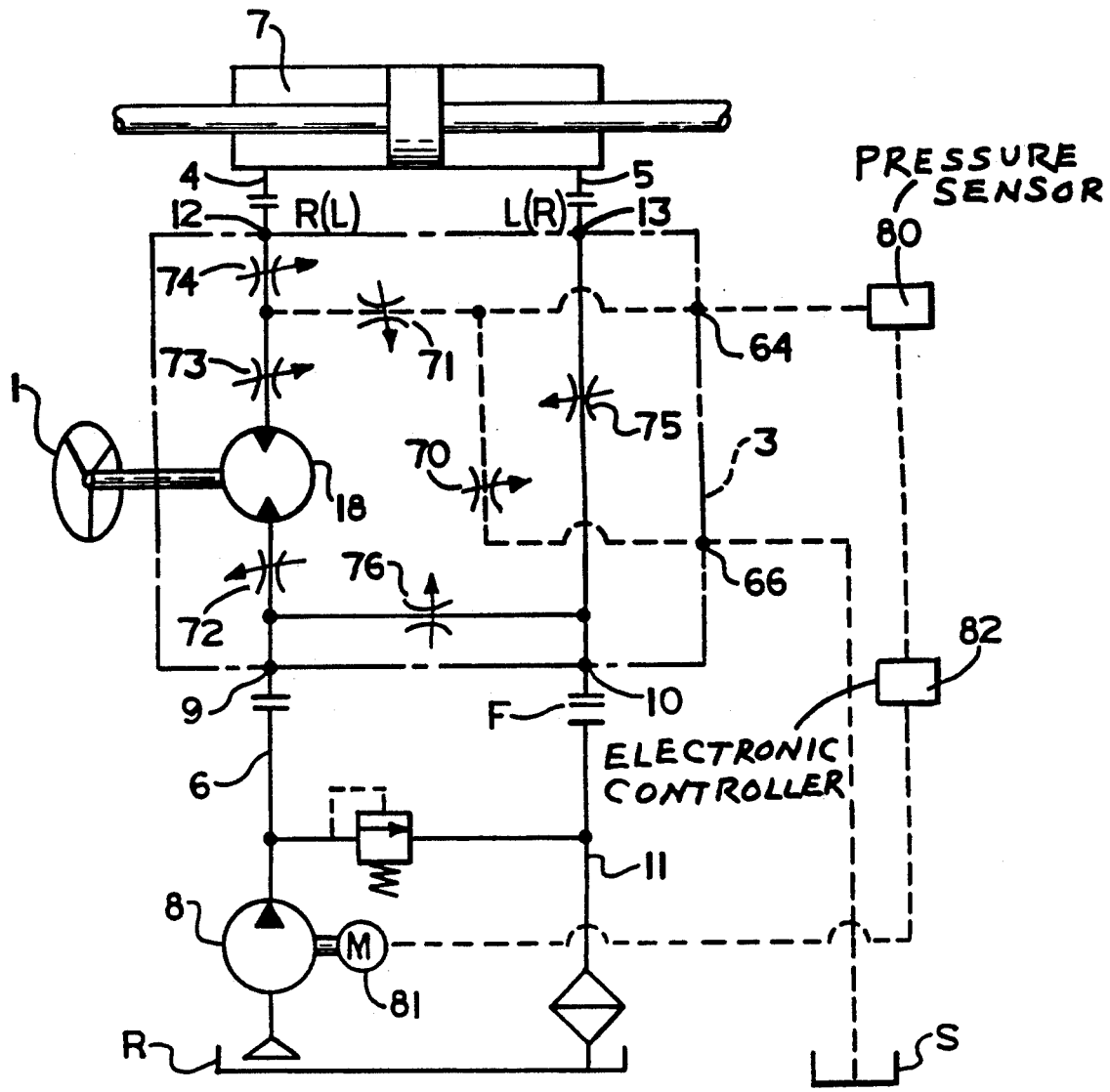
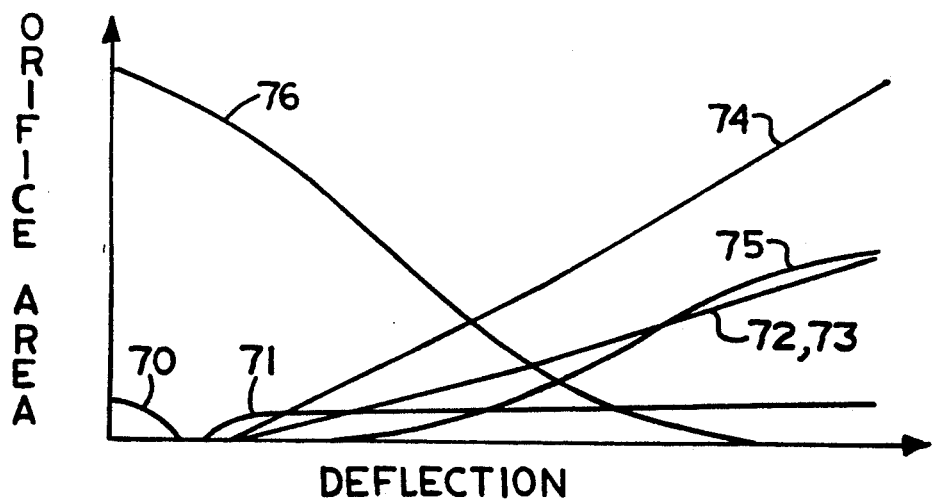
FIG. 7

HYDRAULIC POWER STEERING SYSTEM WITH INPUT DETECTION CAPABILITY

BACKGROUND OF THE DISCLOSURE

This application claims priority, under 35 U.S.C. 119, of earlier-filed Japanese Application No. 63973/1992, filed Mar. 19, 1992.

The present invention relates to hydraulic power steering systems, and more particularly, to such a system including a steering control valve having an input detection device.

Conventional hydraulic power steering systems are already well known to those skilled in the art, and are illustrated and described in U.S. Pat. Nos. 4,034,419 and 5,020,618, both of which are assigned to the assignee of the present invention and incorporated herein by reference.

The typical hydraulic power steering system includes a steering control unit having directional control valving, comprising a spool and a sleeve, operated by an input such as a steering wheel. A steering cylinder is connected to the steering control unit through right and left hydraulic lines. A source supplies pressurized fluid for the steering cylinder through a hydraulic line connected to the steering control unit. The steering unit includes a housing having inlet and outlet ports and right and left control fluid ports, and a fluid meter having internally and externally-toothed members. The directional control valving controls fluid communication between the various ports and the fluid meter.

In the application of many such hydraulic power steering systems, it is especially desirable to be able to detect the torque being applied to the input to the steering unit, i.e., the torque being applied to the input shaft which connects the steering wheel to the spool of the directional valving. Typically, it is necessary that the detection of the input torque be fairly accurate.

In order to meet such requirements, those skilled in the art have developed various system modifications requiring parts to be added to the steering control unit. This results in additional complication and cost of the overall system. Those skilled in the art have also attempted to perform torque or input detection by sensing the pressure at the inlet port of the steering control valve. However, this is typically not accurate enough because of variations in the pump discharge pressure and the amount of opening of the control orifices in the steering valve.

SUMMARY OF THE INVENTION

Accordingly, it is an object of the present invention to provide a hydraulic power steering system having improved torque or input detection capability, but which is not, as a result, much more complicated in construction, or larger or more expensive.

The above and other objects of the invention are accomplished by the provision of a hydrostatic power steering system including a steering control unit operated by an input, a steering cylinder hydraulically connected with the steering control unit through left and right hydraulic lines, and a fluid pressure source for supplying pressurized fluid through a fluid supply line. The steering control unit comprises a housing defining an inlet port, an outlet port, and left and right control fluid ports. A fluid meter has an internally-toothed member and an externally-toothed member disposed within the internally-toothed member for orbital and rotational movement therein, and there is a directional control valve for controlling flow of pressurized fluid between the ports and the fluid meter. The directional control valve includes a rotatable valve spool which is operably associated with the input. A relatively rotatable sleeve valve defines, at its outer periphery first and second annular grooves, the sleeve valve further defining first and second radial through bores communicating with the first annular groove, and a third radial through bore communicating with the second annular groove. The spool valve defines an axial slit communicating with the first, second, and third radial through bores. The housing defines a pressure detection port and a drain port in fluid communication with the first and second annular grooves, respectively, of the sleeve valve. A first orifice is formed between the first radial through bore and the axial slit, and a second orifice if formed between the second radial through bore and an axial groove containing pressurized fluid.

In accordance with a more specific aspect of the present invention, the outlet port is in fluid communication with a system reservoir containing fluid at a pressure substantially greater than atmospheric pressure, and the drain port is in fluid communication with a fluid sump containing fluid at a pressure approximately equal to that of atmospheric pressure.

BRIEF DESCRIPTION OF THE DRAWINGS

FIG. 1 is a hydraulic schematic of a power steering system including the present invention.

FIG. 7 is a graph of orifice area versus spool and sleeve displacement (deflection), showing each of the flow control orifices illustrated schematically in FIG. 1.

DESCRIPTION OF THE PREFERRED EMBODIMENT

Figure 2:
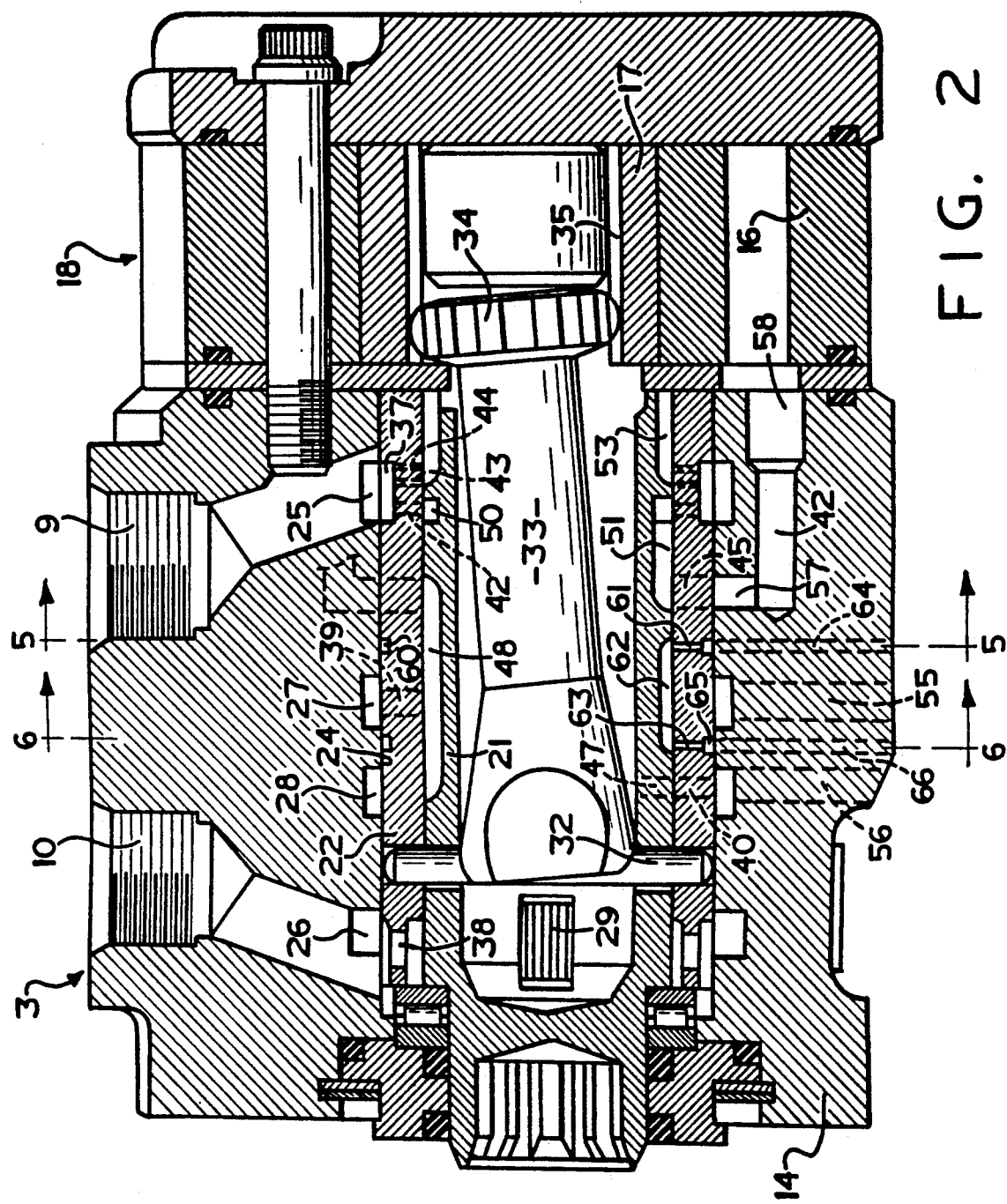
FIG. 2 is a longitudinal cross-section of a steering control unit embodying the invention shown in FIG. 1.

Referring now to the drawings, which are not intended to limit the invention, FIG. 1 illustrates schematically a hydrostatic power steering system made in accordance with the present invention. In FIG. 1, there is shown an input such as a steering wheel 1, which provides an input torque to a steering control unit (SCU) 3. The SCU 3 is connected by a left hydraulic line 4 and a right hydraulic line 5 to a steering cylinder 7. The SCU 3 receives pressurized fluid from an oil pressure source 8, which may be a conventional fixed displacement pump, with the pressurized fluid being communicated through a hydraulic line 6 to an inlet port 9.

The SCU 3 includes an outlet port 10, which is connected, through a filter F and a hydraulic line 11 to a system reservoir R. By way of example only, and not limitation, the hydrostatic power steering system of the invention would typically be used in an overall vehicle hydraulic system wherein the reservoir R is maintained at a pressure (e.g., 200 PSI) which is substantially greater than atmospheric pressure. In some vehicle applications, the pressure in the reservoir R (sometimes referred to as "regulated tank") is intentionally maintained at such an elevated pressure.

The SCU 3 is connected to the hydraulic line 4 at a right port 12, and is connected to the hydraulic line 5 at a left port 13. Referring now primarily to FIG. 2, these ports 12 and 13 are defined by a housing 14 which includes an internally-toothed member 16, and disposed eccentrically therein, an externally-toothed member 17. Together, the members 16 and 17 comprise a fluid meter 18. Referring still to FIG. 2, rotatably disposed within the housing 14 is a valve spool 21, also referred to as the primary valve member, the valve spool 21 being surrounded by a sleeve valve 22, also referred to as a follow-up valve member. The spool valve 21 and sleeve valve 22 are illustrated further, and will be described in connection with, FIGS. 3 through 6.

Referring still to FIG. 2, the housing 14 defines a center bore 24 wherein are formed annular grooves 25, 26, 27, and 28, which communicate with ports 9, 10, 12, and 13, respectively. A centering spring 29 is fitted at both ends thereof into through bores defined by the spool valve 21 and sleeve valve 22, in a manner which is well known to those skilled in the art, and forms no part of the present invention. A pin 32 extends, at both ends thereof, through bores defined by the spool valve 21, and are tightly fit within the bores defined by the sleeve valve 22. A drive shaft 33 is provided, at its forward end, with a bifurcated portion through which the pin 32 extends, and at the other end, with a splined head 34 which is in splined engagement with internal splines 35 defined by the externally-toothed member 17.

Figure 3:
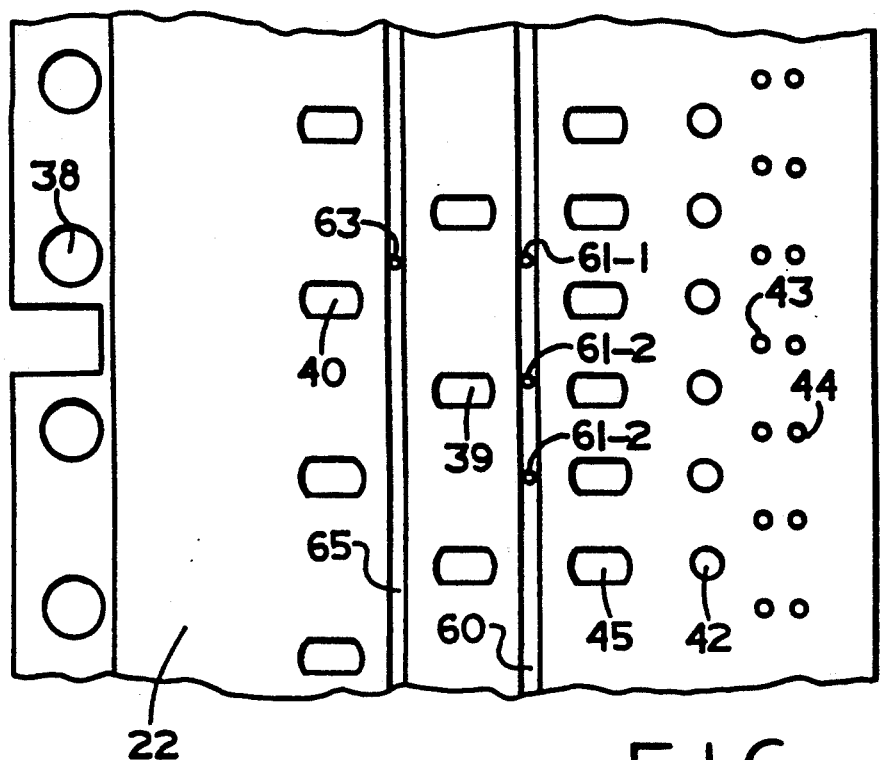
FIG. 3 is a flat plan view of a sleeve valve made in accordance with the present invention.

Referring now to FIG. 3, in conjunction with FIG. 2, the sleeve valve 22 is provided with an annular groove 37, shown only in FIG. 2, which is in communication with the annular groove 25. The sleeve valve 22 is also provided with radial bores 38, which communicate with the annular groove 26, and radial bores 39 and 40 communicating with the annular grooves 27 and 28, respectively. The sleeve valve 22 is also provided with radial through bores 42, 43, and 44 in open communication with the annular groove 37. Finally, the sleeve valve 22 also defines a plurality of radial through bores 45.

Figure 4:
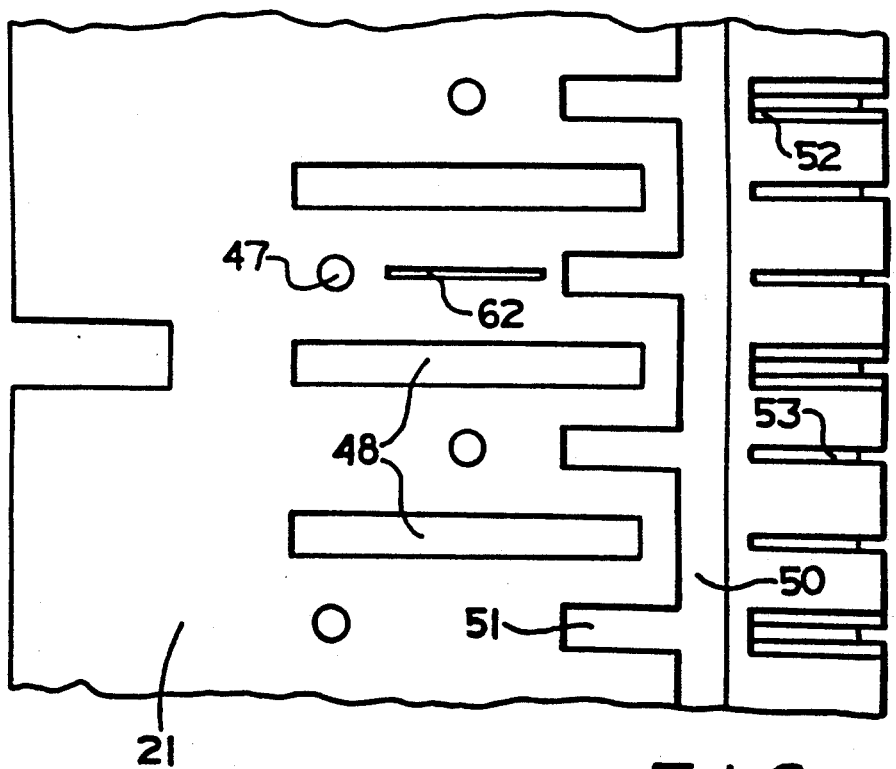
FIG. 4 is a flat plan view of a spool valve made in accordance with the present invention.
Figure 6:
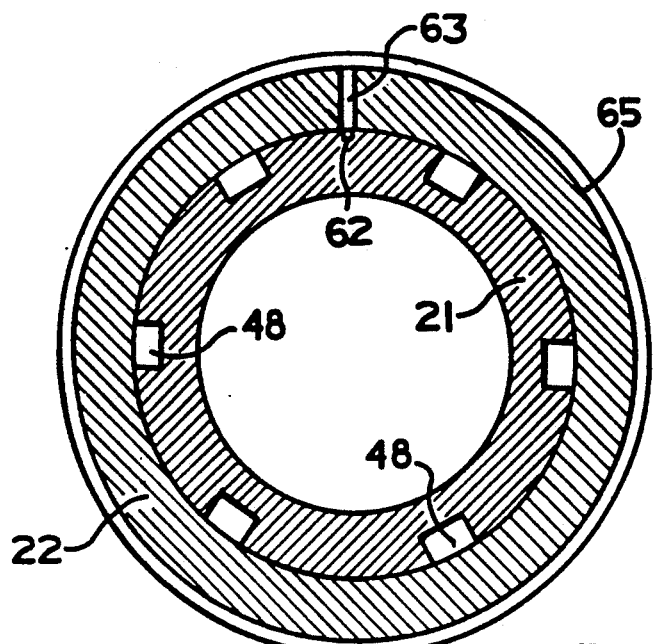
FIG. 6 is a transverse cross-section, taken on line 6—6 of FIG. 2, also showing only the spool valve and sleeve valve.
Figure 5:
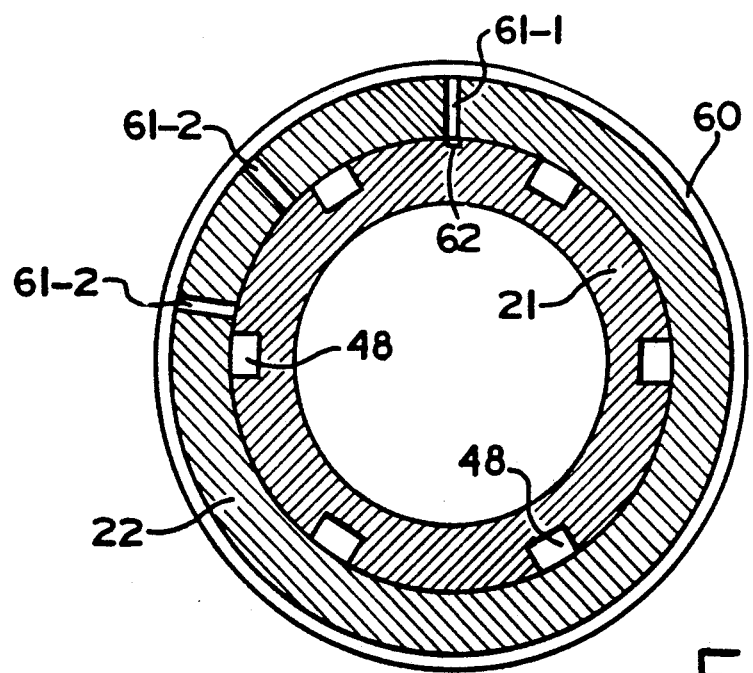
FIG. 5 is a transverse cross-section, taken on line 5—5 of FIG. 2, but showing only the spool valve and sleeve valve.

Referring now to FIG. 4, in conjunction with FIG. 2, the spool valve 21 is provided with radial through bores 47, communicating with the bores 40 defined by the sleeve 22, and a plurality of axial grooves 48, extending to the left in FIG. 4 past the bores 47. An annular groove 50 is in open communication with the bores 42 defined by the sleeve 22, and a plurality of axial grooves 51 extends from the annular groove 50, far enough to the left in FIG. 4, to overlap the rightward ends of the axial grooves 48. A plurality of axial grooves 52 and 53 are in fluid communication with the radial bores 43 and 44, when the spool 21 and sleeve 22 are in their relative neutral position, and extend axially to the right end (in FIG. 4) of the spool 21. Therefore, with the spool 21 and sleeve 22 in their neutral position, the bores 43 and 44 communicate through the axial grooves 52 and 53 with the interior of the spool 21, and from there communicate to the return port 10, and then the system reservoir R. The overlap of the bores 43 and 44 and the axial grooves 52 and 53 together constitute a neutral variable flow control orifice 76 (see FIG. 1) such that the SCU 3 is an open-center unit.

Referring again primarily to FIG. 2, the housing 14 defines a radial bore 55 communicating with the port 12, and a radial bore 56 communicating with the port 13. A plurality of radial bores 57 are in commutating fluid communication with the radial through bores 45 defined by the sleeve 22, in a manner well known to those skilled in the art. An axial bore 58 extends from each radial bore 57, to communicate with one of the volume chambers defined by the toothed interaction of the members 16 and 17 of the fluid meter 18, also in a manner well known to those skilled in the art. The various elements of the SCU 3 described up to this point are conventional in the steering art, and will not be described in greater detail. The subsequent description will be directed primarily to those elements of the SCU 3 which differ from the conventional steering system.

Referring again to FIG. 3, the outer surface of the sleeve valve 22 defines a first annular groove 60, disposed axially between the radial bores 39 and 45, and an annular groove 65, disposed axially between the radial bores 39 and 40. A first radial bore 61-1 is in fluid communication with the annular groove 60, as is a pair of radial bores 61-2. A radial bore 63 is in fluid communication with the second annular groove 65. The spool valve 21 defines an axial slit 62, which is in fluid communication with both the radial bore 61-1 and the radial bore 63, when the spool and sleeve are in the neutral position. The housing 14 of the SCU 3 is provided with a pressure detection port 64 and a drain port 66 (see FIGS. 1 and 2), which are in fluid communication with the annular grooves 60 and 65, respectively. The overlap of the bore 61-1 and the axial slit 62 defines a first variable orifice 70 (see FIG. 1), while the overlap of one of the bores 61-2 and the axial groove 48 defines a second variable orifice 71.

The pressure detection port 64 is in fluid communication with a pressure detector 80, and is capable of providing an appropriate electrical signal to a controller 82 which, in turn, transmits an appropriate signal to an electric motor 81. The motor 81 drives the oil pressure source 8. On a vehicle such as a battery-operated forklift truck, the system shown in FIG. 1 is especially effective and operates generally as follows: when the steering wheel 1 is rotated with a particular input torque, a corresponding pressure signal is generated downstream of the fluid meter 18, and is communicated through the variable orifice 71 to the pressure detection port 64. The pressure detector 80 then generates an electrical signal, corresponding to the sensed pressure, to drive the electric motor 81 and pump 8 at a speed sufficient to generate a fluid pressure corresponding to the input torque from the steering wheel 1.

In the operation of the SCU 3, as described above, when the vehicle operator rotates the steering wheel 1, the centering spring 29 is deflected to cause angular displacement between the spool 21 and the sleeve 22. Fluid flows from the inlet port 9 through a series of variable flow control orifices 72, 73, 74, and 75, defined by the spool 21 and the sleeve 22, as is well known to those skilled in the art. The area of the orifices 72 through 75 (see FIG. 7) is generally proportional to the input from the steering wheel 1. The flow through the variable orifices 72 through 75 (also referred to as the "main fluid path") flows through the fluid meter 18, and also flows to and from the steering cylinder 7 through the right and left ports 12 and 13. The flow through the fluid meter 18 causes rotation of the externally-toothed member 17, thus driving the shaft 33, pin 32, and sleeve 22, thus tending to restore the spool 21 and sleeve 22 to their relative neutral positions, i.e., imparting "follow-up" to the sleeve 22.

Without the present invention, the pressure detection circuit of the SCU 3 would be drained back to the system reservoir R, typically at the elevated pressure as described previously. As a result, the pressure detector 80 would have to be set to begin detecting pressures above the elevated pressure of the regulated system reservoir, and thus, it would typically occur that, upon rotation of the steering wheel 1, the spool 21 and sleeve 22 would reach maximum relative displacement (referred to as operation "on the pin") before sufficient pressure would be generated in the pressure detection circuit to activate the detector 80. Such operation would typically cause jerky, irregular steering action, especially at steering start-up.

With the present invention, when the steering wheel 1 is rotated, the second variable orifice 71 is initially closed, and the first variable orifice 70 is open, thus draining the entire pressure detection circuit including the pressure detection port 64, to the drain port 66. The drain port 66 is preferably connected to a sump S which is at a substantially lower pressure than the system reservoir. For example, the sump S may be at substantially atmospheric pressure. As a result, the pressure detection circuit is drained to substantially zero pressure. When the steering wheel 1 is rotated rightwardly or leftwardly, the orifice 70 is closed and then the orifice 71 begins to open (see FIG. 7), whereby steering pressure in the main fluid path is communicated through the orifice 71 to the pressure detection port 64, and detected by the pressure detector 80, as described previously. Thus, the pressure detected at the detection port 64 is independent of any back pressure present in the system reservoir R, which allows the pressure detector 80 to be set to begin transmitting a signal to the electric motor 81 at a much lower pressure setting than was previously possible. Therefore, at steering start-up, the motor 81 begins to drive the pump 8 at a lower pressure, thus resulting in a substantially smoother steering response. With the present invention, this is accomplished without the need for additional structure which would make the entire system more complicated, larger, and more expensive.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A hydrostatic power steering system including a steering control unit operated by an input, a steering cylinder hydraulically connected to said steering control unit through a left hydraulic line and a right hydraulic line, and a fluid pressure source for supplying pressurized fluid to said steering control unit through a fluid supply line; said steering control unit comprising a housing defining an inlet port, an outlet port, and right and left control fluid ports, a fluid meter having an internally-toothed member, and an externally-toothed member disposed within said internally-toothed member for orbital and rotational movement therein, and a directional control valve for controlling flow of pressurized fluid between said ports and said fluid meter, said directional control valve including a rotatable spool valve operably associated with said input, and a relatively rotatable sleeve valve defining, at its outer periphery, first and second annular grooves, said sleeve valve further defining first and second radial through bores communicating with said first annular groove, and a third radial through bore communicating with said second annular groove; said spool valve defining an axial slit selectively communicating with said first and third radial through bores; said housing defining a pressure detection port and a drain port in fluid communication with said first and second annular grooves, respectively, of the sleeve valve, whereby a first orifice is formed between said first radial through bore and said axial slit, and a second orifice is formed between said second radial through bore and an axial groove containing pressurized fluid.

2. A hydrostatic power steering system as claimed in claim 1, characterized by said outlet port being in fluid communication with a system reservoir containing fluid at a pressure substantially greater than atmospheric pressure, and said drain port is in fluid communication with a fluid sump containing fluid at a pressure approximately equal to atmospheric pressure.

3. A hydrostatic power steering system as claimed in claim 1, characterized by said housing, said spool valve and said sleeve valve cooperating to define a main fluid path communicating between said inlet port and said right control fluid port, through said fluid meter, when said spool valve and said sleeve valve are displaced relative to each other from a neutral position to an operating position, said axial groove comprising part of said main fluid path.

4. A hydrostatic power steering system as claimed in claim 3, characterized by said first orifice being formed only when said spool valve and said sleeve valve are in the region of said neutral position, and said second orifice being formed only when said spool valve and said sleeve valve are in said operating position.

5. A hydrostatic power steering system including a steering control unit operated by an input, a steering cylinder hydraulically connected to said steering control unit, and a fluid pressure source for supplying pressurized fluid to said steering control unit; said steering control unit comprising a housing defining an inlet port, an outlet port, and first and second control fluid ports; valve means controlling the flow of fluid from said inlet port to said first control fluid port, and from said second control fluid port to said outlet port, to define a main fluid path, said outlet port being in fluid communication with a system reservoir containing fluid at a pressure substantially greater than atmospheric; said housing defining a pressure detection port in fluid communication with said main fluid path through a variable signal orifice, said signal orifice being closed when said valve means is in a neutral position; said housing further defining a drain port in fluid communication with a signal circuit through a variable drain orifice, said signal circuit including said pressure detection port and said variable signal orifice, said drain port being in fluid communication with a system sump containing fluid at a pressure substantially less than the pressure in said system reservoir, said variable drain orifice having a maximum flow area when said valve means is in said neutral position, and a decreasing flow area as said valve means is displaced from said neutral position toward an operating position.

6. A hydrostatic power steering system as claimed in claim 5, characterized by said system sump containing fluid at a pressure approximately equal to atmospheric pressure.

7. A hydrostatic power steering system as claimed in claim 5, characterized by said fluid pressure source comprises a pump and means operable to drive said pump, and vary the fluid output of said pump, in response to an input from an electrical controller.

8. A hydrostatic power steering system as claimed in claim 7, characterized by said electrical controller being responsive to a signal from a pressure detector which is in fluid communication with said pressure detection port of said steering control unit.

* * * * *